Dec. 22, 1942.  G. G. SOMERVILLE  2,306,230
ELECTRIC VALVE TRANSLATING SYSTEM
Original Filed March 30, 1942

Inventor:
Gareth G. Somerville,
by *Harry E. Dunham*
His Attorney.

Patented Dec. 22, 1942

2,306,230

UNITED STATES PATENT OFFICE 2,306,230

ELECTRIC VALVE TRANSLATING SYSTEM

Gareth G. Somerville, Pittsfield, Mass., assignor to General Electric Company, a corporation of New York Original application March 30, 1942, Serial No. 436,813. Divided and this application July 10, 1942, Serial No. 450,440

4 Claims. (Cl. 219—4)

My invention relates to electric valve translating systems and more particularly to electric valve systems wherein energy is periodically transmitted to a load circuit, such as a welding circuit, by means of electric valve apparatus and energy storage devices.

This application is a division of my copending patent application Serial No. 436,813, filed March 30, 1942, and which is assigned to the assignee of the present application.

In some industrial applications, such as electric resistance welding equipments, it is frequently desirable to transmit to a load circuit, or welding circuit, a predetermined amount of current of relatively short duration. In accordance with the teachings of my invention described hereinafter, I provide new and improved electric valve equipment wherein this object may be accomplished by employing apparatus to greater advantage, thereby decreasing the size of the equipment to supply a given amount of power or energy to the load or welding circuit.

It is an object of my invention to provide new and improved electric valve translating apparatus.

It is another object of my invention to provide new and improved electric welding apparatus.

It is a further object of my invention to provide a new and improved electric valve energy storage and transmitting system for transmitting impulses of current to a load circuit, such as a welding circuit, from an alternating current supply circuit.

Briefly stated, in the illustrated embodiment of my invention a capacitance is connected to an alternating current supply circuit and is discharged through the welding transformer during successive half cycles of voltage of the supply circuit by voltage controlling means, such as electric valve apparatus. The electric valve apparatus may comprise a pair of reversely connected electric valve means of the controlled type which are rendered conducting alternately.

Figure 1:
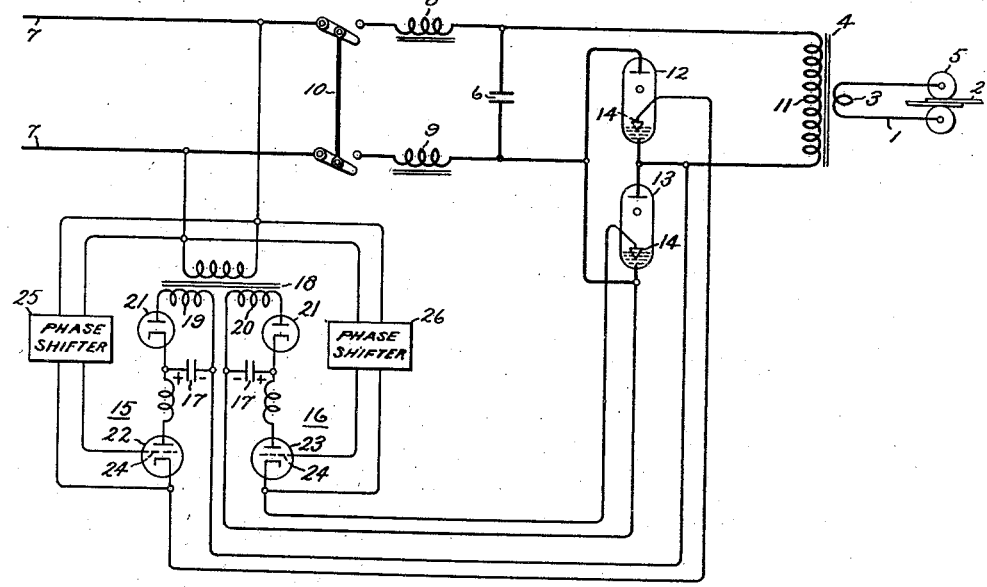
Figure 2:
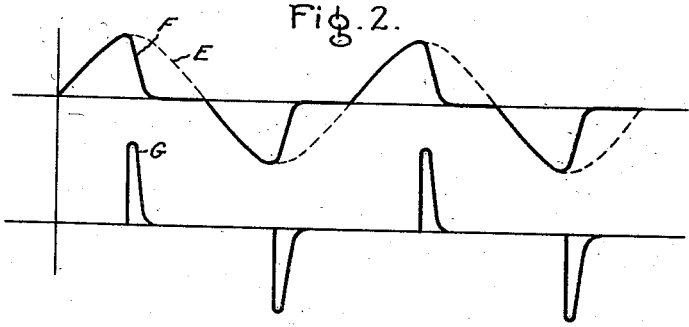

For a better understanding of my invention, reference may be had to the following description taken in connection with the accompanying drawing, and its scope will be pointed out in the appended claims. Fig. 1 illustrates diagrammatically an embodiment of my invention wherein a capacitance is connected to an alternating current supply circuit and wherein the capacitance is discharged during successive half cycles of voltage by means of a pair of reversely connected electric valve means thereby supplying an impulse of welding current to the associated circuit during successive half cycles of voltage of the supply circuit; Fig. 2 represents certain operating characteristics of the arrangement shown in Fig. 1.

Referring now to Fig. 1 of the drawing, I have there illustrated my invention as applied to a system which is capable of high speed operation to transmit impulses of current to a load circuit, such as a welding circuit 1, in rapid succession. The work 2 to which the welding current is applied may be connected to a secondary winding 3 of a welding transforming means 4 by means of electrodes 5.

A capacitance 6 is energized from an alternating current supply circuit 7 and is discharged by suitable circuit controlling means to transmit impulses of welding current to the welding circuit 1. More particularly, the capacitance 6 may be connected to the supply circuit 7 through reactive means such as inductances 8 and 9, to prevent appreciable discharge current of the capacitance 6 from being transferred to the supply circuit 7 during the discharging operations. A circuit controlling means, such as a switch 10, may be employed to connect the system to the supply circuit 7.

I connect between the primary winding means 11 of the transforming means 4 a pair of circuit controlling means which discharge the capacitance 6 in opposite directions through primary winding means 11 during successive half cycles of voltage of supply circuit 7, preferably at times within the neighborhood of the 90 electrical degree points of the voltage wave of the supply circuit 7. In the embodiment of my invention illustrated in Fig. 1, I employ a pair of normally nonconducting reversely connected electric valve means 12 and 13 which are selectively controlled to discharge the capacitance 6 during successive half cycles of voltage of the supply circuit. The electric valve means 12 and 13 are preferably of the type employing an ionizable medium, such as a gas or a vapor, and each comprises an immersion-igniter control member 14 which, when properly energized, renders the electric valve means conducting and effects discharge of capacitance 6.

Electric valve means 12 and 13 are controlled by circuits which, in turn, are energized by circuits 15 and 16 respectively. These circuits alternately transmit unidirectional impulses of current to the control members 14, and each comprises a capacitance 17 which is charged by a rectifier. The rectifiers may be energized from the alternating current supply circuit 7 through a transformer 18 including secondary windings 19 and 20. In addition, each rectifier includes a unidirectional conducting device or electric valve 21 which charges the associated capacitance to the polarity indicated. The impulses of voltage which render the electric valve means 12 and 13 conducting include electric discharge devices 22 and 23 which are of the controlled type, each having a control member or grid 24. The phase of the voltages impressed on grids 24 is determinable or controllable by means of phase shifting devices 25 and 26.

If desired, a timing circuit or timing means, may be connected to the control circuits 15 and 16 so that the electric valve means 12 and 13 are rendered conducting at predetermined recurring intervals separated by intervals of nonconduction. That is, the electric valve means 12 and 13 may be rendered conducting during a predetermined consecutive number of half cycles of voltage of supply circuit 7 and may be maintained nonconducting during a predetermined succeeding number of successive half cycles of voltage of supply circuit 7. In such an arrangement, timing means may be connected between the grids 24 of the electric discharge devices 22 and 23 of circuits 15 and 16.

The operation of the embodiment of my invention shown in Fig. 1 will be explained by considering the system when it is operating to transmit an impulse of welding current to the work 2 during each half cycle of voltage of supply circuit 7. Upon closure of switch 10, the capacitance 6 is connected to the supply circuit 7. Electric valve means 12 and 13 are rendered conducting alternately, but by virtue of timed relationship of the impulses of current transmitted to control members 14, are not continuously conducting; the conduction of current being initiated at times determined by the adjustment of phase shifting devices 25 and 26. I have found that satisfactory welds are produced by adjustment of phase shifting devices 25 and 26, so that electric valve means 12 and 13 are rendered conducting at about the 90 electrical degree points of both half cycles of the voltage wave of the supply circuit.

The operation of the embodiment of my invention shown in Fig. 1 may be more fully explained by considering the operating characteristics shown in Fig. 2. Curve E represents the sinusoidal voltage of supply circuit 7. The heavy curve F represents the wave form of the voltage appearing across capacitance 6 when the electric discharge devices 12 and 13 are rendered conducting at about the 90 electrical degree points of the positive and negative half cycles of voltage of the supply circuit 7. Curve G represents the current transmitted to the welding circuit 1 occasioned by the discharge of capacitance 6 through primary winding means 20 of the transforming means 4.

It will be observed that by virtue of the polarity of the electric valve means 12 and 13, successive impulses of current transmitted to the primary winding means traverse this winding in opposite directions, thereby preventing cumulative unidirectional magnetization of the core structure of the transforming means 4 which would otherwise be effected if the capacitance discharged through the winding means in the same direction.

It will be apparent, in view of the above description, that apparatus built in accordance with my invention offers decided advantages, one of the principal advantages being the rapidity or speed of operation by utilizing the capacitance during successive half cycles, that is, during both the positive and negative half cycles of the voltage of supply circuit 7.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent in the United States is:

1. In combination, an alternating current supply circuit, a welding circuit, transforming means including primary winding means, a capacitance connected to said alternating current circuit, a pair of circuit controlling means connected between said primary winding means and said capacitance, and means for controlling said pair of circuit controlling means to become conducting alternately and for discharging said capacitance through said primary winding means at approximately 90 electrical degree points of the positive and negative half cycles of voltage of said supply circuit.

2. In combination, an alternating current supply circuit, a welding circuit, transforming means connected to said welding circuit and comprising primary winding means, a capacitance connected to said supply circuit, a pair of circuit controlling means connected between said capacitance and said primary winding means, and means for controlling said circuit controlling means and for discharging said capacitance through said primary winding means during successive half cycles of voltage of said supply circuit.

3. In combination, an alternating current supply circuit, a welding circuit, a capacitance connected to said supply circuit, transforming means connected to said welding circuit and comprising primary winding means, a pair of reversely connected electric valve means connected between said capacitance and said primary winding means, said electric valve means each comprising a control member for controlling the conductivity thereof, and means connected to the control members for rendering said electric valve means conducting alternately during successive half cycles of voltage of said supply circuit and for effecting discharge of said capacitance in opposite directions through said primary winding means.

4. In combination, an alternating current supply circuit, a welding circuit, transforming means connected to said welding circuit and comprising primary winding means, a capacitance energized from said supply circuit, a pair of reversely connected normally nonconducting unidirectional conducting devices connected between said capacitance and said primary winding means, and means for rendering said unidirectional conducting devices conducting alternately during successive half cycles of voltage of said supply circuit to discharge said capacitance in opposite directions through said primary winding means.

GARETH G. SOMERVILLE.